(12) United States Patent
Liu et al.

(10) Patent No.: US 6,535,668 B2
(45) Date of Patent: Mar. 18, 2003

(54) RETRO-REFLECTIVE MULTI-PORT FILTER DEVICE WITH TRIPLE-FIBER FERRULE

(75) Inventors: Yuqiao Liu, Sunnyvale, CA (US); Peter C. Chang, Mountain View, CA (US); Wei-Shin Tsay, Saratoga, CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 09/817,938

(22) Filed: Mar. 26, 2001

(65) Prior Publication Data

US 2001/0046349 A1 Nov. 29, 2001

Related U.S. Application Data

(63) Continuation-in-part of application No. 09/576,758, filed on May 23, 2000, now Pat. No. 6,400,862, and a continuation-in-part of application No. 09/255,047, filed on Feb. 22, 1999, now Pat. No. 6,246,812.

(51) Int. Cl.[7] ................................................ G02B 6/32
(52) U.S. Cl. .............................. 385/33; 385/24; 385/27; 385/34; 385/78; 385/83; 359/127; 359/128
(58) Field of Search .............................. 385/24, 27, 31, 385/33, 34, 65, 78, 83; 359/124, 127, 128, 131

(56) References Cited

U.S. PATENT DOCUMENTS

| | | | | |
|---|---|---|---|---|
| 5,742,712 A | * | 4/1998 | Pan et al. ...................... | 385/18 |
| 5,748,350 A | * | 5/1998 | Pan et al. .................... | 359/130 |
| 5,796,889 A | * | 8/1998 | Xu et al. ...................... | 385/24 |
| 5,838,847 A | * | 11/1998 | Pan et al. ...................... | 385/18 |
| 6,044,187 A | * | 3/2000 | Duck et al. .................... | 385/33 |
| 6,400,862 B1 | * | 6/2002 | Liu et al. ...................... | 385/24 |

* cited by examiner

*Primary Examiner*—John D. Lee
*Assistant Examiner*—Jennifer Doan

(57) ABSTRACT

A retro-reflective multi-port fiber optic device includes the triple-fiber ferrule with a GRIN rod lens to couple the light. The triple-fiber ferrule with three fibers thereof is attached to the angled facet of the GRIN rod lens and the WDM filter is attached to the opposite side of the lens. A reflective mirror is aligned with and attached next to the other side of the WDM filter opposite to the lens. The triple-fiber ferrule, which is specifically selected from adense series of triple-fiber ferrules respectively defining three-fiber assemblies with different fiber spacings, is used to couple light in and out of the device, and tune the filter center wavelength to the desired ITU grid.

22 Claims, 3 Drawing Sheets

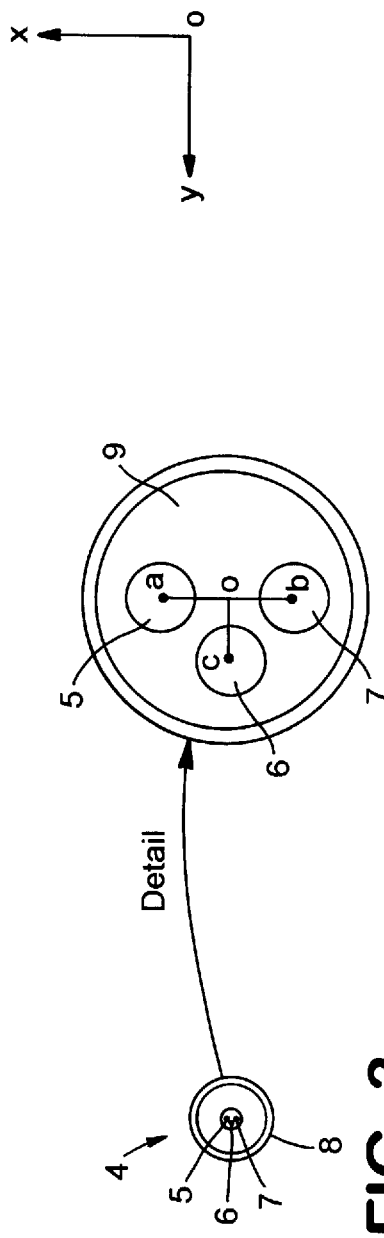
FIG. 3
FIG. 4
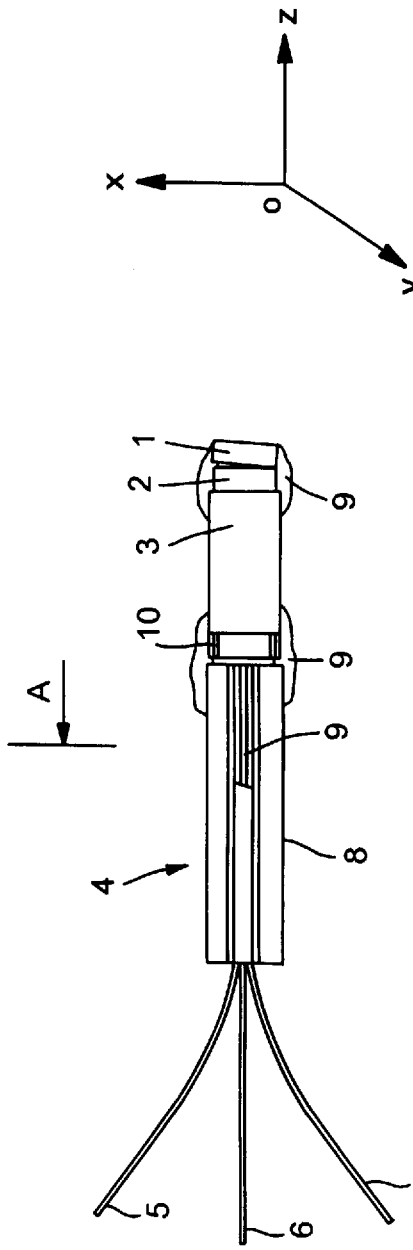
FIG. 5

RETRO-REFLECTIVE MULTI-PORT FILTER DEVICE WITH TRIPLE-FIBER FERRULE

This application is a CIP of the application Ser. No. 09/576,758 filed on May 23, 2000, now U.S. Pat. No. 6,400,862 and a CIP of the application Ser. No. 09/255,047 filed on Feb. 22, 1999, now U.S. Pat. No. 6,246,812.

BACKGROUND OF THE INVENTION

1. Field of the Invention

The invention relates to the technology of making optical WDM (Wavelength-Division-Multiplexing) multiplexer or demultiplexer using triple-fiber ferrule.

2. The Related Art

The future communication networks demand ever increasing bandwidth. By transmitting several channels in a single optical fiber at different wavelengths, WDM can greatly enhance the transmission capacity of the optical fiber communication networks. A device that combines different wavelength channels into one fiber is a so-called multiplexer, and a device that divides the multiplexed channels into individual ones is a so-called demultiplexer. A variety of technologies have been exploited to develop high performance WDM multiplexer/demultiplexer, including fiber Bragg granting, optical integrated circuit, fused fiber Mach-Zander interferometer, interference thin film coating technology etc. An international standard wavelength grid has been suggested by the ITU (International Telecommunication Union) for the center wavelengths of the WDM channels. The prior arts use a Y-branch structure of three conventional fiber optic collimators to tune the filter center wavelength to the ITU grid. The incident wavelength of such a multiplexer/demultiplexer is made to coincide with a desired ITU wavelength. The disadvantage in the prior arts is mainly in the difficulty of reducing its size to achieve a robust and compact structure thereof. An approach has been disclosed in the copending application Ser. No. 09/255,047 filed on Feb. 22, 1999, now U.S. Pat. No. 6,246,812, in which a robust and compact structural multiplexer/demultiplexer relative to the prior arts is presented by means of V-groove ferrules. Anyhow, it is still desired to have a smaller, less-components structure for the multiplexer/demultiplexer.

Therefore, an object of the invention is to provide a multiplexer/demultiplexer with a half-sized structure thereof relative to that disclosed in the aforementioned copending application so as to result in a compact, robust structure thereof, low cost and flexibility in manufacturing, and high stability in hazardous environment. A copending application Ser. No. 09/576,756 filed May 23, 2000, now U.S. Pat. No. 6,400,862, discloses an approach to achieve this goal. Anyhow, the invention is to provide an improvement to such approach's application.

SUMMARY OF THE INVENTION

The retroreflective multi-port fiber optic device with triple-fiber ferrule in the present invention is designed for use as WDM multiplexer/demultiplexer. One embodiment of the invention using a GRIN rod lens to couple the light. The triple-fiber ferrule is attached to the angled facet of the GRIN rod lens and the WDM filter is attached to the opposite side of the lens. A reflective mirror is aligned and attached next to the other side of the WDM filter.The selected one from a series of triple-fiber ferrules isused to couple light in and out of the device and tune the thin film filter center wavelength to the ITU grid. The light coupled in from the common input pigtail fiber of the triple-fiber ferrule will be collimated and transmitted onto the WDM filter. The part of the in-pass-band light will transmit through the WDM filter, then retro-reflected back by the mirror and transmit through the WDM band-pass filter again. The retro-reflected in-pass-band signal is then coupled into the transmission output port of the triple-fiber ferrule as a demultiplexed channel.

Same incidence angles to the WDM filter are required for the transmitted and retroreflected in-pass-band light beam to achieve the best performance from the WDM filter. In order to maintain the same incidence angle onto the WDM filter. The three pigtail fiber centers in the triple-fiber ferrule are located on a round virtual circle with the connecting segment of the common input pigtail fiber and the reflection output pigtail fiber as a diameter. The center of this virtual round circle is also substantially coincident with the lens optical axis. Typically the three fibers are located at the three tips of a T-shape. Particularly selected fiber spacing is used to match the specific WDM filter. The invention has especially low cost and high flexibility in achieving a series of different fiber spacing for tuning the center wavelength of a band-pass WDM filter to coincide with that of the ITU grid. The part of the out-pass-band light is directly reflected back by the WDM filter and coupled into the reflection output pigtail fiber of the triple-fiber ferrule to be transmitted to the next stage for demultiplexing other channels. All parts of the device are bounded together by adhesives such as epoxy after alignment.

The features of the invention further includes provision of a series of three-fiber ferrules which respectively define three-fiber assemblies with different virtual circle diameters. Under this condition, the technician can select the specific one from this series of three-fiber ferrules to precisely meet/coincide with the filter to reach the desired center wavelength required by ITU.

The invention results in especially low cost and high flexibility in achieving a dense series of different fiber spacings for tuning the center wavelength of a given band-pass WDM filter to coincide with that of the ITU grid.

BRIEF DESCRIPTION OF THE DRAWINGS

FIG. 3 is a cross-sectional view of the device along line 3—3 of FIG. 2.

FIG. 4 is an partially enlarged cross-sectional view of the device of FIG. 4.

FIG. 5 is a side view (taken from XOZ plane) of another embodiment of the invention where a spacer is added.

FIG. 6 is a side view (taken from YOZ plane) of another embodiment of

FIG. 5 to show the angled facets applied on the ferrule and the lens with a spacer therebetween.

DETAILED DESCRIPTION OF THE PREFERRED EMBODIMENT

Figure 1:
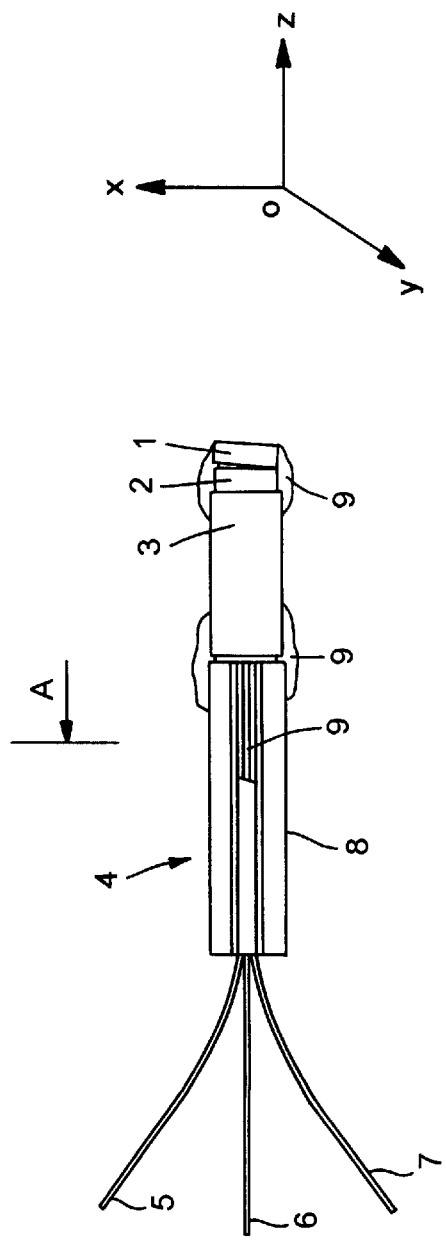
FIG 1 is a side view (taken from XOZ plane) of a presently preferred first embodiment of a retro-reflective multi-port WDM device with the triple-fiber ferrule, according to the invention.
Figure 2:
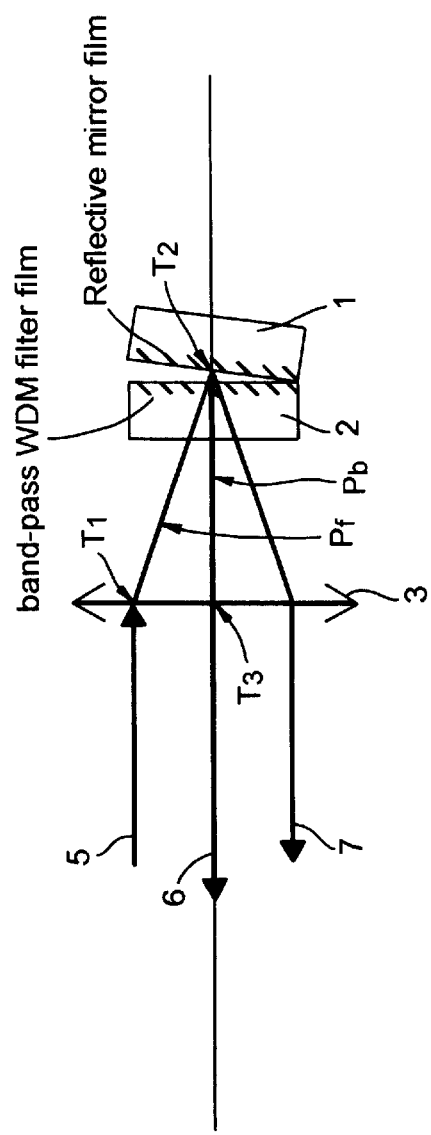
FIG. 2 is an enlarged simplified side view of the device of FIG. 1 to show the light path therein.

References will now be in detail to the preferred embodiments of the invention. While the present invention has been described in with references to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

It will be noted here that for a better understanding, most of like components are designated by like reference numbers therethrough the various figures in the embodiments. Attention is directed to FIGS. 1–6 Wherein the present invention is a multi-port fiber optic device with triple-fiber ferrules, comprising a triple-fiber ferrule means 4, a lens 3, a band-pass WDM filter 2, and a reflective mirror 1. All properly aligned and bonded together in one single piece by adhesive 9.

A multiplexed WDM signal is coupled into said multi-port fiber optic device through a common input pigtail fiber 5. The part of the in-passband light will be collimated by lens 3 and transmit through said WDM filter 2 the first time, and then retroreflected by mirror 1 and pass through the WDM filter 2 the second time with substantially same incidence angle as the first time. The in-pass-band light is then coupled into a transmission output pigtail fiber 6 of said input triple-fiber ferrule means 4 as a demultiplexed channel. The part of the out-pass-band light is directly reflected back by the WDM filter 2, and coupled into a reflection output pigtail fiber 7 of the triple-fiber ferrule means 4 to be transmitted to the next stage for demultiplexing other channels.

The fiber spacing or the diameter of the virtual circle in said triple-fiber ferrule means 4 is selected from a dense series of ferrules with different spacing to match said WDM filter 2, so that the input beam incident upon filter 2 will have such an incidence angle that filter center wavelength would substantially coincide with a designated ITU grid line.

The triple-fiber ferrule means 4 are aligned to said lens 3 with their axes substantially coincide and their angled facets facing each other. Said WDM filter 2 is directly bounded to the another facet of said lens 3. The relative position of said angled facets of ferrule means 4 and lens 3 is adjusted and aligned. Then said lens 3 is fixed with said triple-fiber ferrule means 4 by adhesives 9. The waists of the two collimated light beams of said input pigtail fiber 5 and reflection output pigtail fiber 7 fiber shall substantially coincide with WDM filter 2, and the insertion loss between pigtail fiber 5 and pigtail fiber 7 shall achieve its minimum.

The reflection mirror 1 is positioned right behind said WDM filter 2 to retroreflect the in-pass-band light back through the WDM filter 2 again. Due to this double-pass of said WDM filter 2, the isolation performance of such a WDM multiplexing/demultiplexing device will be doubled in decibel compared with other single-pass structure. Said reflection mirror 1 is adjusted and aligned so that the light out from common input pigtail fiber 5 can be coupled back into said transmission output pigtail fiber 6 with minimum insertion loss. After such alignment, said mirror 1 is directly fixed with said WDM filter 2 by adhesives 9.

The lens 3 is typically a gradient-index (GRIN) rod lens, and typically has one of their facets angled relative to its own axis in order to reduce unwanted back reflections in said multi-port fiber optic device.

Figure 6:
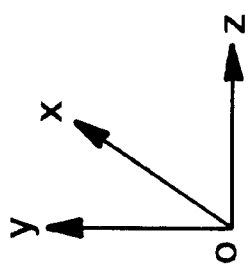
Figure 6:
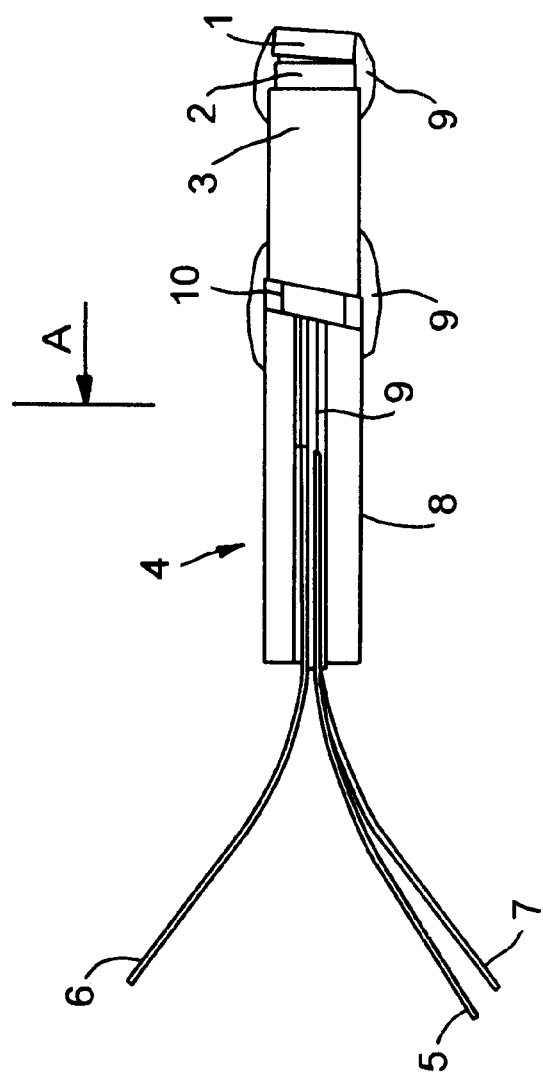

Referring to both FIGS. 5 and 6, in order to position the pigtail fiber end surfaces of said ferrule means 4 in the focal plane of said lens 3, a center hollowed spacer 10 may be applied to the angled facet of said lens 3. The coated film of said WDM filter 2 and said mirror 1 shall be located substantially coincident with the opposite focal plane of said lens 3.

The triple-fiber ferrule means 4 comprises a first common input pigtail fiber 5, a second transmission output pigtail fiber 6, a third reflection output pigtail fiber 7, and a sleeve 8 enclosing said first, second, and third pigtail fibers inside. Said pigtail fibers are embedded in said sleeve 8 by adhesives like epoxy. Viewed at the cross section of said triple-fiber ferrule means 4, All the centers of said three pigtail fibers are located on a roundvirtual circle with said common input pigtail fiber 5 and said reflection output pigtail fiber 7 substantially forms a diameter of said virtual circle. The optical axis of said lens 3 is substantially coincident with the center of said virtual circle. Connecting the centers of said pigtail fibers would typically form a T-shape. The focal length of said lens 3 together with the fiber spacing in said circle or T-shape will determine the incidence angle on the WDM filter 2. A dense series of triple-fiber ferrule means 4 with different fiber spacing in said circle or T-shape or diameters, are produced to match each specific WDM filter for tuning the center wavelength to the ITU grid.

In order to reduce the back reflection in input fiber, both the triple fiber ferrule and the lens are typically angled. As the angling of the ferrule and the lens equivalently changed the relative optical positioning between the lens and the ferrule, proper arrangement can use this angling and the change of the positioning to the advantage of reducing the transmission path alignment insertion loss. As shown in FIG. 4. The transmission pigtail fiber 6 is positioned at the shorter side of the GRIN lens, equivalently,compared with the common input fiber 5 and the reflection fiber 7, a little bit more inward toward the lens. As the fiber pigtail ends should be substantially located in the focal plane of the lens to achieve minimum insertion loss for the reflection signal, in comparison, fiber pigtail end positioned relatively inward a little bit will move the Gaussian beam waist slightly outward away from focal plane on the other side of the lens and thus compensate the additional propagation distance introduced by the reflection mirror in the transmission path. Therefore by extruding the transmission pigtail fiber 6 relative to the common input fiber 5 and reflection fiber 7 will minimize the insertion loss in the transmission fiber 6 while keeping the loss in the reflection fiber 7 minimum.

After embedding said three pigtail fibers inside said sleeve 8 with their relative positions described above, the end facet of said triple fiber ferrule means 4 is ground, polished and anti-reflection coated. Referring to FIG. 6, the end facet 41 of said triple-fiber ferrule means 4 is angled about 8 degrees, relative to the XOY plane in a rectangular coordinate (X,Y,Z) system wherein axis Z defines the axial direction of the ferrule means 4, the fibers 5 and 7 are located on the XOZ plane, and the fiber 6 is positioned above the XOZ plane and closer to the acute angle point A, defined on the YOZ plane, of the angled end facet 41 of the ferrule means 4. Understandably, the normal line of the angled end facet 41 is tilted away from the axial direction of the ferrule means 4 with about 8 degrees.

Another feature of the invention is to provide the reflection mirror 1 in a tilted manner relative to axis X (referring to FIG. 5) and axis Y (referring to FIG. 6) of the XOY plane, so as to (referring to FIG. 2) minimize the optical alignment insertion loss between pigtail fiber 5 and 6, by establishing the reflection paths $P_f$ and $P_b$, wherein $P_f$ is defined between point $T_1$ on the lens 3 and point $T_2$ on the reflection mirror 1, and $P_b$ is defined between point $T_2$ on the reflection mirror 1 and point $T_3$ on the lens 3. As known well, the light is reflected with the reflective angle same as the incident angle relative to the normal line of the reflection device. Different from the reflection output pigtail fiber 7 which is located in a symmetrical manner with the common input pigtail fiber 5 relative to the center axis of the ferrule means 4, the transmission output pigtail fiber 6 is positioned in an asymmetrical manner with the common input pigtail fiber 5 relative to the center axis of the ferrule means 4. Thus, the reflection mirror 1 is tilted relative to both axis X and axis Y with the normal line thereof directing to both the fiber 5 and fiber 6 rather than the fiber 7 for properly and correctly establishing those reflection paths $P_f$ and $P_b$, based on the relative positions among the fibers 5, 6 and 7. Without this correct titling, such reflection paths can not be achieved.

While the present invention has been described with reference tospecific embodiments, the description is illustrative of the invention and is not to be construed as limiting the invention. Various modifications to the present invention can be made to the preferred embodiments by those skilled in the art without departing from the true spirit and scope of the invention as defined by the appended claim.

Therefore, person of ordinary skill in this field are to understand that all such equivalent structures are to be included within the scope of the following claims.

We claim:

1. A method of assembling a retro-reflective multi-port fiber optic device, comprising the steps of:
   providing a lens with a specific filter attached to one facet thereof;
   providing a series of triple-fiber ferrules respectively defining three-fiber assemblies with different fiber spacings;
   selecting one of said triple-fiber ferrules with precise spacing among three fibers disposed therein to match the filter for tuning a center wavelength to a pre-designated wavelength; and
   positioning said selected ferrule by the other facet of said lens opposite to said filter; wherein
      said three fibers includes one common input pigtail fiber, one transmission output pigtail fiber, and one reflection output pigtail fiber;
   positioning a mirror closely to one side of said filter opposite to said lens;
   wherein
      said transmission output pigtail fiber end extends a little bit longer than those of said common input pigtail fiber and said reflection output pigtail fiber along an axial direction of the said selected ferrule.

2. The method as defined in claim 1, wherein one end of said selected ferrule which faces the lens, is angled along a slope to reduce back reflection.

3. The method as defined in claim 2, wherein the common input pigtail fiber and the reflection output pigtail fiber are at the same level on said slope.

4. The method as defined in claim 3, wherein by applying a rectangular coordinate XYZ system to the device, an axial direction of the selected ferrule is represented by axis Z, the common input pigtail fiber and the reflection output pigtail fibers are arranged to be located in XOZ plane on the same level relative to axis Y, and the transmission output pigtail fiber is located on a different level relative to axis Y.

5. The method as defined in claim 4, wherein the transmission output pigtail fiber is closer to an acute angle point, defined on plane YOZ, on said end of the selected ferrule, than the common input pigtail fiber and the reflection output pigtail fiber.

6. The method as defined in claim 2, wherein spacer is provided between said lens and said selected ferrule, and said spacer is tilted.

7. The method as defined in claim 1, wherein a spacer is provided between said lens and said selected ferrule.

8. A method of assembling a retro-reflective multi-port fiber optic device, comprising the steps of:
   providing a lens with a specific filter attached to one facet thereof; providing a series of triple-fiber ferrules respectively defining three-fiber assemblies with different fiber spacings, wherein said triple-fiber ferrules comprising a common input pigtail fiber, a transmission output pigtail fiber and a reflection output pigtail fiber therein, the three pigtail fibers forming a virtual circle with the segment connecting the common input fiber and the reflection output fiber as its diameter;
   selecting one of said triple-fiber ferrules with precise spacing among three fibers disposed therein to match the filter for tuning a center wavelength to a pre-designated wavelength; and
   positioning said selected ferrule by the other facet of said lens opposite to said filter; wherein
      said three fibers includes one common input pigtail fiber, one transmission output pigtail fiber, and one reflection output pigtail fiber;
   positioning a mirror closely to one side of said filter opposite to said lens.

9. The method as defined in claim 8, wherein one end of said selected ferrule which faces the lens, is angled along a slope to reduce back reflection.

10. The method as defined in claim 9, wherein the common input pigtail fiber and the reflection output pigtail fiber are at the same level on said slope.

11. The method as defined in claim 10, wherein by applying a rectangular coordinate XYZ system to the device, an axial direction of the selected ferrule is represented by axis Z, the common input pigtail fiber and the reflection output pigtail fibers are arranged to be located in XOZ plane on the same level relative to axis Y, and the transmission output pigtail fiber is located on a different level relative to axis Y.

12. The method as defined in claim 11, wherein the transmission output pigtail fiber is closer to an acute angle point, defined on plane YOZ, on said end of the selected ferrule, than the common input pigtail fiber and the reflection output pigtail fiber.

13. The method as defined in claim 9, wherein on the angled end of said ferrule, said transmission output pigtail fiber end extends a lttle bit longer than those of said common input pigtail fiber and said reflection output pigtail fiber along an axial direction of the said selected ferrule.

14. The method as defined in claim 9, wherein spacer is provided between said lens and said selected ferrule, and said spacer is tilted.

15. The method as defined in claim 8, wherein a spacer is provided between the said lens and said selected ferrule.

16. A retro-reflective multi-port fiber optic device comprising:
   a triple-fiber ferrule with a common input pigtail fiber, a transmission output pigtail fiber and a reflection output pigtail fiber therein,the three pigtail fibers forming a virtual circle with the segment connecting the common input fiber and the reflection output fiber as its diameter;
   a lens positioned by one side of said ferrule;
   a filter positioned on one side of said lens opposite said ferrule; and
   a mirror positioned on one side of said filter opposite to said lens;

wherein
the transmission output pigtail fiber is positioned in an asymmetrical manner with the common input pigtail fiber relative to a center axis of the ferrule.

17. The device as defined in claim 16, wherein one end of said ferrule which faces the lens, is angled along a slope, and the common input pigtail fiber and the reflection output pigtail fiber are at the same level on said slope.

18. The device as defined in claim 17, wherein on the angled end of said ferrule, said transmission output pigtail fiber end extends a little bit longer than those of said common input pigtail fiber and said reflection output pigtail fiber along an axial direction of the said ferrule.

19. The device as defined in claim 16, wherein by applying a rectangular coordinate XYZ system to the device, an axial direction of the selected ferrule is represented by axis Z, the common input pigtail fiber and the reflection output pigtail fibers are arranged to be located in XOZ plane on the same level relative to axis Y, and the transmission output pigtail fiber is located on a different level relative to axis Y.

20. The device as defined in claim 19, wherein the transmission output pigtail fiber is closer to an acute angle point, defined on plane YOZ, on said end of the selected ferrule, than the common input pigtail fiber and the reflection output pigtail fiber.

21. The device as defined in claim 1, wherein a spacer is provided between the said lens and said selected ferrule.

22. The method as defined in claim 21, wherein said spacer is tilted.

* * * * *